Figure 1:
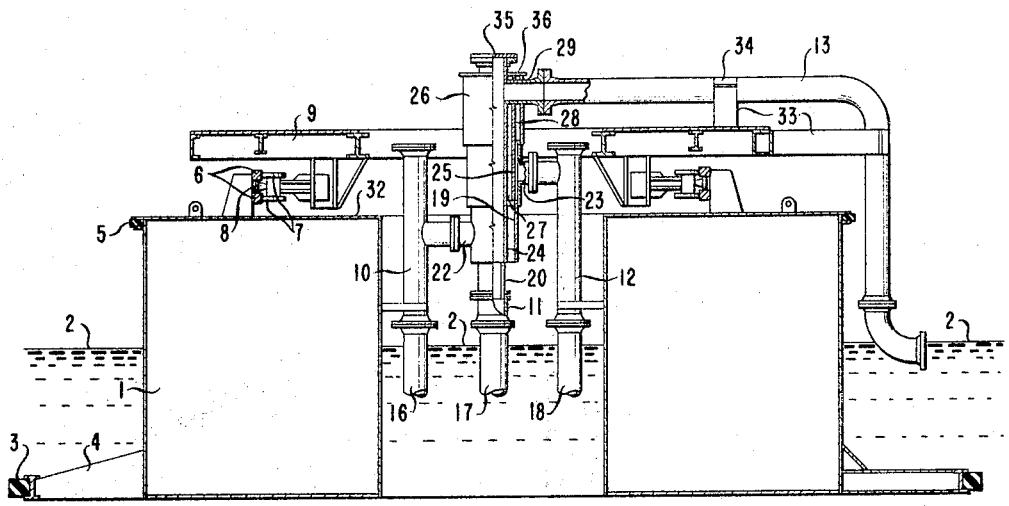

Aug. 9, 1966  A. O. YOUNG  3,264,662
BUOY FOR LOADING AND UNLOADING SHIPS
Filed Aug. 7, 1964  2 Sheets-Sheet 1

INVENTOR:
ALASTAIR O. YOUNG
BY: *Oswald W. Wilmore*
HIS ATTORNEY

Aug. 9, 1966  A. O. YOUNG  3,264,662
BUOY FOR LOADING AND UNLOADING SHIPS
Filed Aug. 7, 1964  2 Sheets-Sheet 2

INVENTOR:
ALASTAIR O. YOUNG
BY:
HIS ATTORNEY

United States Patent Office 3,264,662
Patented August 9, 1966

3,264,662
BUOY FOR LOADING AND UNLOADING SHIPS
Alastair O. Young, Lutong, Sarawak, Malaysia, assignor to Shell Oil Company, New York, N.Y., a corporation of Delaware
Filed Aug. 7, 1964, Ser. No. 402,045
Claims priority, application Netherlands, Aug. 7, 1963, 296,352
6 Claims. (Cl. 9—8)

This invention relates to a buoy for loading and/or unloading ships, which buoy comprises a float, a number of liquid lines secured to the float, a number of liquid lines secured to a part rotatable relative to the float and movable means for connecting the two sets of lines to each other.

By means of such buoys it is possible to moor a tanker to the buoy, and to pump liquids, such as petroleum products, from a reservoir to the tanker via the buoy or vice versa. It is often desired to load or unload several different liquids simultaneously. In such a case the buoy should be provided with several liquid lines and relatively rotatable parts providing a plurality of isolated flow channels between said parts. Such multi-channel swivel connections have heretofore been bulky and inconvenient in assembly and adjustment.

It is an object of the invention to provide a buoy in which said relatively rotatable parts are compact and do not project too far above the buoy.

Broadly, the invention provides a buoy for transferring a plurality of different petroleum products to or from a ship moored to the buoy by means comprising a first plurality of conduits fixedly secured to the buoy and adapted for connection individually to each of a plurality of tubular shore lines located in the water beneath the buoy, a second plurality of conduits extending from the top of the buoy and adapted for similar connection to a plurality of flexible lines extending to a ship moored to the buoy, and a rotatable coupling means between said first and second pluralities of conduit providing for rotation of said second plurality of conduits with respect to said first plurality of conduits.

More specifically, the rotatable coupling of the buoy comprises a number of concentric pipes having different diameters, placed within each other and immovably joined to form a unit. The axes of said pipes coincides with the vertical center line of the float, and concentric bushings of different diameters are fixedly secured to the float on the same central axis. A liquid-tight connection is provided between the end of each pipe and the end of each corresponding bushing, and each liquid-tight connection allows rotation of the pipe relative to the corresponding bushing. The liquid-tight connections are arranged at different levels, viz. the one of the pipe and bushing having the smallest diameter may be situated at the lowest level and the one of the pipe and bushing having the largest diameter at the highest level. The separate spaces enclosed by the pipes and the bushings are provided with liquid supply and discharge means which are respectively in communication with the liquid lines secured to the float and with the liquid lines secured to the part rotatable relatively to the float or vice versa. Preferably, the liquid supply or discharge means secured to the pipes of the unit comprises pipe sections radially directed relatively to the longitudinal axes of the pipes of the unit.

Figure 2:
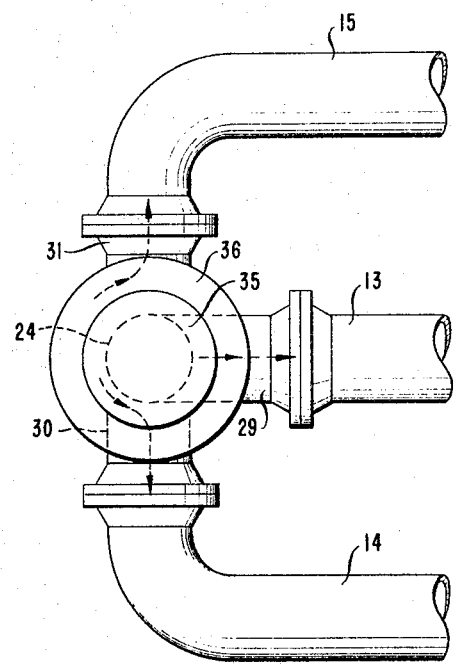
Figure 3:
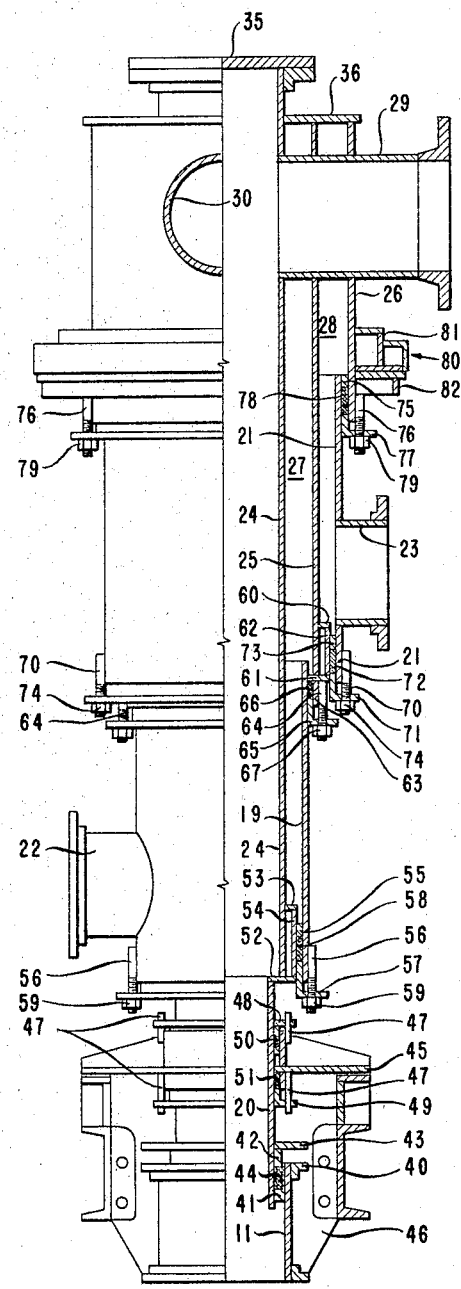

The invention will now be described with reference to the accompanying drawings wherein:

FIGURE 1 shows a lateral cross-section of the buoy according to the invention;
FIGURE 2 is an enlarged partial plan view showing the pipe unit and a series of radial pipe sections connected to a plurality of conduits which lead away from the top of the buoy and function as liquid supply or discharge means; and,
FIGURE 3 shows the pipe unit and the corresponding bushings on an enlarged scale partially in elevation and partially in cross-section.

The float 1 consists of a hollow ring, which is rectangular in cross-section and which is internally provided with vertical watertight partitions and strengthening elements (not shown in the drawings). In FIGURE 1 the surface of the water is indicated at 2. A fender 3, situated below the surface of the water 2 is preferably made of a rubber cushion held in an annular channel and connected to the float 1 by means of support members 4. Above the surface of the water there is a similar fender 5. The float 1 is provided with securing elements for anchor chains (not shown in the drawings), e.g., attached to its bottom wall, so that the buoy floating in the water may be anchored.

On the deck 32 of the float 1 are mounted annular rails 6 along which run horizontal and vertical rollers 7 and 8, respectively. The rollers 7 and 8 are secured to a movable part or turntable 9, situated above the deck 32 of the float 1.

Three liquid conduits 10, 11 and 12 are fixedly secured to the float 1. A corresponding number of liquid conduits 13, 14 and 15 are secured to the turntable 9 so that the said conduits move with the turntable 9. Preferably the conduits 13, 14 and 15 are located in a single plane which is substantially parallel to the upper surface of the float 1. Tubes or flexible lines 16, 17 and 18 are connected to the lower ends of the conduits 10, 11 and 12; the said flexible lines may be further coupled to pipelines on the bottom of the sea or in the water below the float 1, sometimes called "shore lines." Bushings 19 and 21 are also fixedly secured to the float 1. The bushing 19 is connected to the conduit 10 by means of a pipe section 22, and the bushing 21 is connected to the conduit 12 by means of a pipe section 23. Furthermore, liquid conduit 11 serves as a bushing fixedly secured to the float 1. The axes of the bushings 11, 19 and 21 coincide with the vertical center line of the float 1. Pipes 24, 25 and 26 are placed inside each other in such a way that their axes coincide with the vertical center line of the float 1.

As best shown in FIGURE 3, the pipes 24, 25 and 26 have increasing graduated diameters so that spaces 27 and 28 are formed between these pipes. The pipes 24, 25 and 26 are tightly connected to each other and are joined together to form a group or unit, so that the said pipes may rotate as a single unit relative to the bushings 11, 19 and 21 and hence relative to the float 1. The upper sides of the pipes 24, 25 and 26 are closed by lids 35 and 36. The pipes 25 and 26 are connected with the bushings 19 and 21, respectively, in a rotatable and liquid-tight manner. The end of the pipe 24 is provided with a part 20 having a smaller diameter than pipe 24. Part 20 of pipe 24 is connected to bushing 11 in a rotatable and liquid-tight manner. The pipe 24 is provided with supply or discharge means consisting of a pipe section 29 which is radially directed relative to the longitudinal axis of the pipe 24. The said pipe section 29 projects in a liquid-tight manner through the walls of the pipes 25 and 26. The pipe 25 is provided with supply or discharge means consisting of a pipe section 30, which is radially directed relative to the longitudinal axis of the pipe 25. As shown in FIGURE 2, the said pipe section 30 projects in a liquid-tight manner through the wall of the pipe 26. Finally, the pipe 26 is provided with supply or discharge means consisting of a pipe section 31 which is radially directed relative to the longitudinal axis of the pipe 26. The axes of the radial pipe sections 29, 30 and 31 are located in a single plane which is parallel to the upper surface or deck 32 of the float 1.

As shown in FIGURE 2, the pipe section 29 is connected to the liquid conduit 13, the pipe section 30 is connected to the liquid conduit 14 and the pipe section 31 is connected to the liquid conduit 15. The liquid conduits 13, 14 and 15 are themselves tightly secured to the turntable 9 by means of the supports 33 and the matching clamps 34 (see FIGURE 1).

Referring again to FIGURE 3, the part 20, fixedly secured to the end of pipe 24, is connected to bushing 11 in a rotatable and liquid-tight manner. The bushing 11 is provided with a flange 40 and a collar 41. A cylindrical element 42 provided with a flange 43 is arranged around part 20 of pipe 24. Between collar 41 and element 42 a suitable packing material 44 (for example, asbestos packing material) is present. Bolts (not shown in the drawings) serve to interconnect flanges 40 and 43 and to compress the packing material 44 so that a liquid-tight seal is obtained. A flange 45 is fixedly secured to bushing 11 by means of ribs or similar elements 46. The flange 45 is provided with bolts 47 which pass through holes in rings 48, 49. Rings 48 and 49 serve to compress a suitable packing material 50 and 51 present between pipe 20, flange 45 and rings 48 and 49.

As shown in FIGURE 3, part 20 is welded to pipe 24 by means of flat rings 52 and 53 and a cylindrical element 54. The fixed bushing 19 surrounding pipe 24 is internally provided with a collar 55 and with bolts 56 at its lower end which are welded to the bushing 19. The bolts 56 pass through holes in a ring 57. The ring 57 is in contact with a suitable packing material 58 which is present between bushing 19 and cylindrical element 54 and which is in contact with collar 55. By means of nuts 59 and the bolts 56 it is possible to move the ring 57 towards collar 55 and to compress the packing material 58. In this way a liquid-tight seal is obtained between the fixed bushing 19 and the pipe 24, the latter being rotatable relative to the bushing 19.

A liquid-tight seal is provided between the end of pipe 25 and the end of the fixed bushing 19 which seal is so constructed that pipe 25 is rotatable relative to the fixed bushing 19. Two flat rings 60 and 61, cylindrical elements 62 and 63 and bolts 64 are welded to the lower end of pipe 25 in the manner shown in FIGURE 3. The bolts 64 pass through holes in a ring 65, which ring is in contact with packing material 66. By tightening the nuts 67, screwed on the bolts 64, the ring 65 can be moved towards the packing material 66 so that the packing material will be compressed and a liquid-tight seal obtained.

A liquid-tight seal is also provided between the end of pipe 25 and the end of the fixed bushing 21 which seal is so constructed that pipe 25 is rotatable relative to the fixed bushing 21. Bolts 70 are welded to one end of the fixed bushing 21. The bolts 70 pass through holes in a ring 71, which ring is in contact with packing material 72. This packing material 72 is present between fixed bushing 21, a collar 73 welded to bushing 21, cylindrical element 62 and ring 71. By tightening the nuts 74, screwed on the bolts 70, the ring 71 can be moved towards the packing material 70 so that the packing material will be compressed and a liquid-tight seal obtained.

Between the end of pipe 26 and the end of the fixed bushing 21 a liquid-tight seal is provided which seal is so constructed that pipe 26 is rotatable relative to the fixed bushing 21. A collar 75 is welded to the interior of the pipe 26 and bolts 76 are welded to the lower outer surface of the pipe 26. The bolts 76 pass through holes in a ring 77. The ring 77 is in contact with packing material 78 which is present between bushing 21 and pipe 26. By tightening the nuts 79, screwed on the bolts 76, the ring 77 can be moved towards the packing material 78 so that the packing material will be compressed and a liquid-tight seal obtained.

A collar 80 is welded to the outer surface of the pipe 26. The upper part 81 and the lower part 82 are in slidable contact with an annular element (not shown in the drawings) which is fixed to the float 1, suitable bearing metals (not shown) and lubricating means (not shown) being present. In this way a bearing is formed which can take up axial forces working on the pipes 24, 25 and 26. In this connection attention is drawn to the fact that the hydraulic pressure of the liquid present within the pipes 24, 25, 26 tends to move these pipes upwards and away from the bushings 11, 19 and 21. The said bearing effectively prevents such upward movement.

During normal use of the apparatus described, a ship is moored to the turntable 9 of the buoy by means of cables connected to a mooring hook (not shown in the drawings) on the turntable 9. Hoses or flexible pipes interconnect the conduits 13, 14 and 15 with the ship. Liquid of a certain type is pumped from a depot and flows to the ship through the float 1 via the line 17, bushing or conduit 11, part 20, pipe 24, radial pipe section 29, conduit 13 and the hose or pipe connected to the ship. Liquid of a different, or possibly of the same, type may, if required be simultaneously pumped to or from the ship through line 16, conduit 10, pipe section 22, bushing 19, the space 27 between pipes 24 and 25, radial pipe section 30, conduit 14 and the hose or pipe connected to the ship. A third liquid may, if required, be pumped simultaneously to the ship from a depot through line 18, conduit 12, pipe section 23, bushing 21, the space between pipes 25 and 26, radial pipe section 31, conduit 15 and the hose or pipe connected to the ship. It will be clear that the liquid may be pumped entirely in the opposite direction if a ship has to be unloaded.

When the ship is displaced relative to the buoy as a result of the winds or water currents, the turntable 9 will turn slightly relative to the float 1. As a result of the movable connection described, the pumping of the liquid can be continued in a normal manner during such turning.

I claim as my invention:

1. A water buoy for interconnecting a plurality of tubular lines located beneath the water with a ship moored to the buoy, said buoy comprising:
   a float member;
   a first plurality of conduit means fixedly secured to said float member and adapted for connection with tubular lines located beneath the water;
   a second plurality of conduit means extending from the top of said float member and adapted for connection with a ship moored to the buoy;
   rotatable connecting means located on said float member and positioned between said first and second pluralities of conduit means, said rotatable connecting means providing for rotational movement of said second plurality of conduits with respect to said first plurality of conduits;
   a plurality of elongated, vertical concentric pipes located on said float and having a common vertical axis coinciding with the vertical center line of said float member; and
   the lowermost ends of said plurality of pipes being arranged at different levels so that the smallest-diameter pipe terminates at the lowest level and the largest-diameter pipe terminates at the highest level, said rotatable connecting means comprising:
      a plurality of concentric bushings fixed to said float member;
      each of said concentric pipes being rotatably mounted at its lower end in one of said bushings.

2. A water buoy as set forth in claim 1 and further comprising liquid-tight sealing and connecting means between each said pipe and its corresponding bushing.

3. A water buoy as set forth in claim 1 wherein each conduit of said second plurality of conduit means is connected to the upper end of a separate one of said concentric pipes.

4. A water buoy as in claim 3 wherein each conduit of said second plurality of conduit means is located in a common horizontal plane on a turntable rotatably mounted on said float, which turntable is mounted substantially parallel to the upper surface of said float.

5. A water buoy as set forth in claim 1 wherein each of said bushings is provided with a radially outwardly extending pipe section in communication with a separate conduit of said first plurality of conduit means.

6. A water buoy as set forth in claim 5 wherein each conduit of said second plurality of conduit means is connected to the upper end of a selected one of said concentric pipes and all of said conduits are located in a common horizontal plane which is substantially parallel to the upper surface of said float.

References Cited by the Examiner
UNITED STATES PATENTS

| | | | |
|---|---|---|---|
| 1,665,655 | 4/1928 | Clisson | 285—136 |
| 2,894,268 | 7/1959 | Griebe | 9—8 |
| 3,082,440 | 3/1963 | Rhedin | 9—8 |

FERGUS S. MIDDLETON, *Primary Examiner.*

MILTON BUCHLER, *Examiner.*

R. G. BESHA, T. MAJOR, *Assistant Examiners.*